United States Patent Office 3,595,625
Patented July 27, 1971

3,595,625
CONTINUOUS CRYSTALLISING EQUIPMENT
John McNichol Bruce, Cumberland, England, assignor to Distington Engineering Company Limited
Filed Jan. 22, 1968, Ser. No. 699,427
Claims priority, application Great Britain, Jan. 27, 1967, 4,163/67
Int. Cl. B01d 9/04
U.S. Cl. 23—273F                10 Claims

ABSTRACT OF THE DISCLOSURE

A continuous fractional crystallisation apparatus comprising an elongate annular vessel having inner and outer cylindrical walls forming between them an annular space, a helical member located within said vessel so as to surround said inner cylindrical wall and extending substantially the whole length of said annular space, and means for rotating said helical member about the major axis thereof within said annular space and relative to said cylindrical walls. The helical member is of composite construction and includes a plurality of co-extensive helical elements assembled together so as to be capable of movement relative to each other and so that a first one of said elements will rotate with a constant relationship to the wall surfaces defining said annular space while a second one of said elements rotates with a variable relationship to said wall surfaces.

---

This invention relates to apparatus for carrying out the process known as continuous fractional crystallisation.

In a fractional crystallisation process, materials having differing solubilities may be separated by sequential stages of crystallisation from, and resolution in, a mother liquor. This process may, with advantage, be carried out continuously and a known method of operation consists in introducing a mixture of materials in solution into an annular-shaped vessel provided with means whereby some sections of the vessel may be heated and some sections may be cooled. Within the annular space of the vessel is a rotatable helical member, the function of which is to convey crystals along the annular space counter-current to the flow of mother liquor. During the operation of such a process in a vessel as described, temperature and saturation gradients or profiles will exist and there will be a varying proportion of solid to liquid phase in the axial sense.

It is desirable that the operating clearances between the surfaces of the helical member and the inner walls of the annular vessel be minimised with the object of restricting passage of liquid between the helical member and the vessel walls so as to provide substantially counter-current transport of solid and liquid phases When torque is applied to one end of the helical member, either to transmit power or simply to initiate rotational movement, dimensional changes will be induced which will either reduce or increase the diameter of the helical member, depending upon the direction of rotation. The magnitude of these changes may vary with speed of rotation or with the power absorbed by the helical member and associated parts of the apparatus; also due to differential expansion effects arising from the axial temperature profile and, in the case where the axis of the helical member is disposed other than vertically, due to natural deflection of the member. It is clear that the magnitude of these dimensional changes will determine the operating clearances which may be achieved. It has been found that for small or pilot scale apparatus helical members can be constructed of sufficient dimensional stability under operating conditions to be consistent with acceptable working clearances. However, when it is desired to scale-up apparatus of this type to commercially useful sizes, severe design problems raise.

The main object of the present invention is to provide a form of helical member which will accommodate the dimensional changes inherent in a commercially useful apparatus and at the same time restrict the operating clearances to a degree consistant with good process efficiency.

As seen from its broadest aspect, the invention provides a continous fractional crystallisation apparatus comprising an elongate annular vessel having inner and outer cylindrical walls forming between them an annular space, a helical member located within said vessel so as to surround said inner cylindrical wall and extending substantially the whole length of said annular space, and means for rotating said helical member about the major axis thereof within said annular space and relative to said cylindrical walls, said helical member being of composite contruction and including a plurality of co-extensive helical elements assembled together so as to be capable of relative movement inter se and so that a first one of said elements will rotate with a constant relationship to the wall surfaces defining said annular space while a second one of said elements rotates with a variable relationship to said wall surfaces.

In order that the invention may be more clearly understood, one embodiment thereof will now be described by way of example only and with reference to the accompanying drawings, in which.

Figure 1:
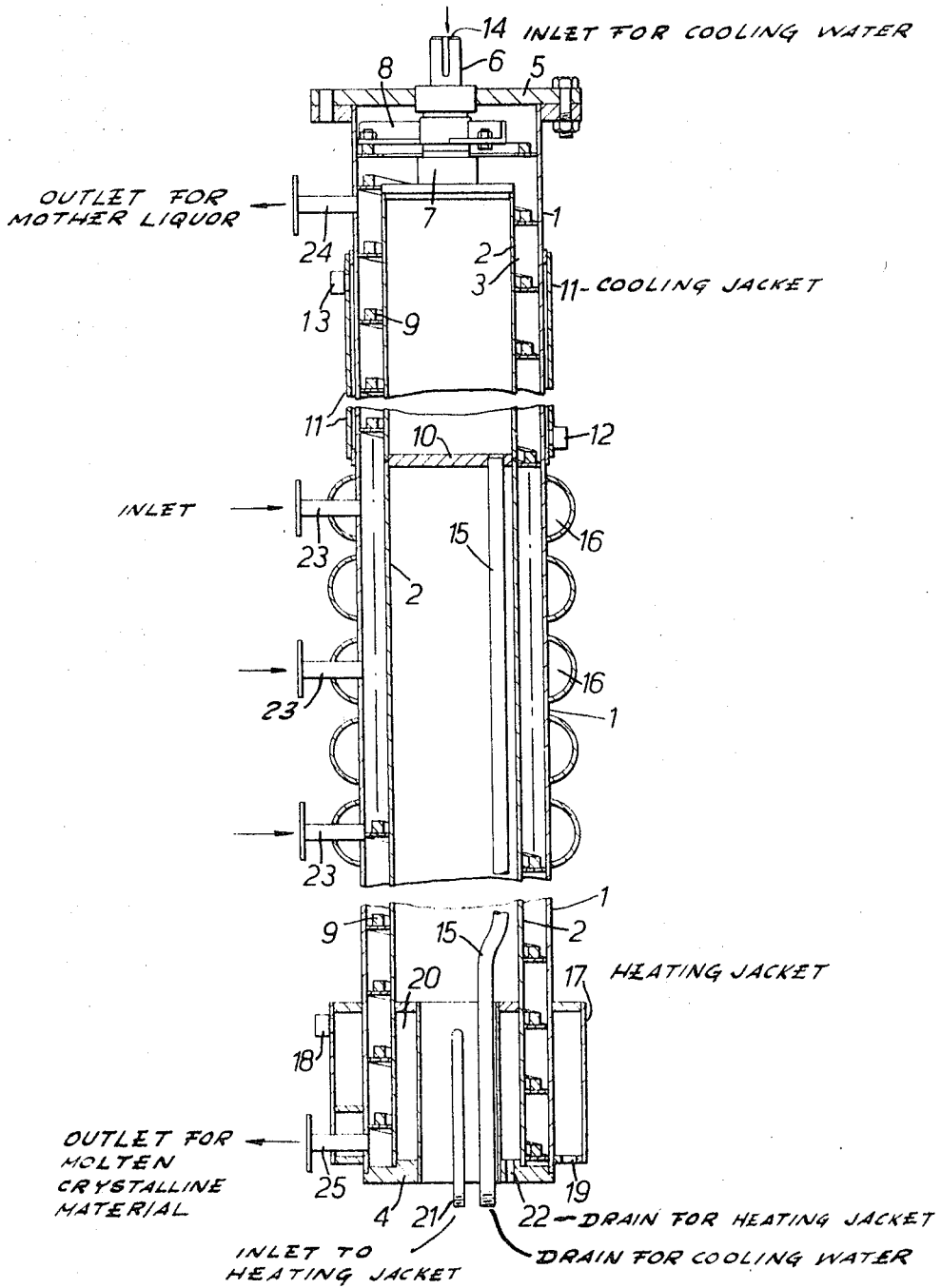
FIG. 1 is a vertical cross-section of apparatus for continuous fractional crystallisation.

Referring to FIG. 1, the continuous fractional crystalisation apparatus is arranged with its axis vertical and comprises an outer cylinder 1 and an inner cylinder 2, the two cylinders being arranged co-axially to define an elongate annular vessel including an annular space 3 which extends substantially the length of the cylinders. The lower end of the annular vessel is closed by a base plate 4 and the upper end leads into a chamber defined by the outer cylinder and closed by a bearing plate 5 through which extends a short drive shaft 6 mounted for rotation about the common axis of the cylinders. The upper external end of the drive shaft is adapted for connection to suitable drive means (not shown) and the lower internal end of the shaft terminates in a bearing 7 and carries a mouting plate 8 which is secured for rotation with the shaft.

Within the annular space 3 is located a helical member 9 which surrounds, and extends the full length of, the inner cylinder. The lower end of the member 9 is free and the upper end is secured to the mounting plate 8 so that the member is rotatable within the annular space when the shaft 6 is driven.

The apparatus includes various facilities for controlling the temperature of different regions of the annular space. Thus, the upper portion of the inner cylinder is separated by a closure plate 10 and, substantially co-extensive with said upper portion, the outer cylinder is surrounded by a jacket 11 having an inlet 12 and an outlet 13 for cooling water. An inlet 14 for cooling water is also provided through the drive shaft 6, the water spraying into the inner cylinder and draining to a pipe 15 which leads out through the base plate 4. The middle portion of the outer cylinder is surrounded by a series of annular jackets 16 which can be supplied (through means not shown) with cooling water or steam as required. At the lower end of the apparatus, the outer cylinder is provided with a steam jacket 17 having an inlet 18 and drain 19, while the inner cylinder is provided with a steam jacket 20 having an inlet 21 and drain 22.

Liquid to be processed by the apparatus is introduced to the annular space through inlets 23 located mid-way up the outer cylinder. It is then subjected to cooling in the upper part of the annular space during which crystalline material is formed. As the helical member 9 rotates, this material is moved downwardly in the annular space and having been melted in the lower part of the space passes out through an outlet 25. Meanwhile the mother liquor moves upwardly and passes out through an outlet 24.

Figure 2:
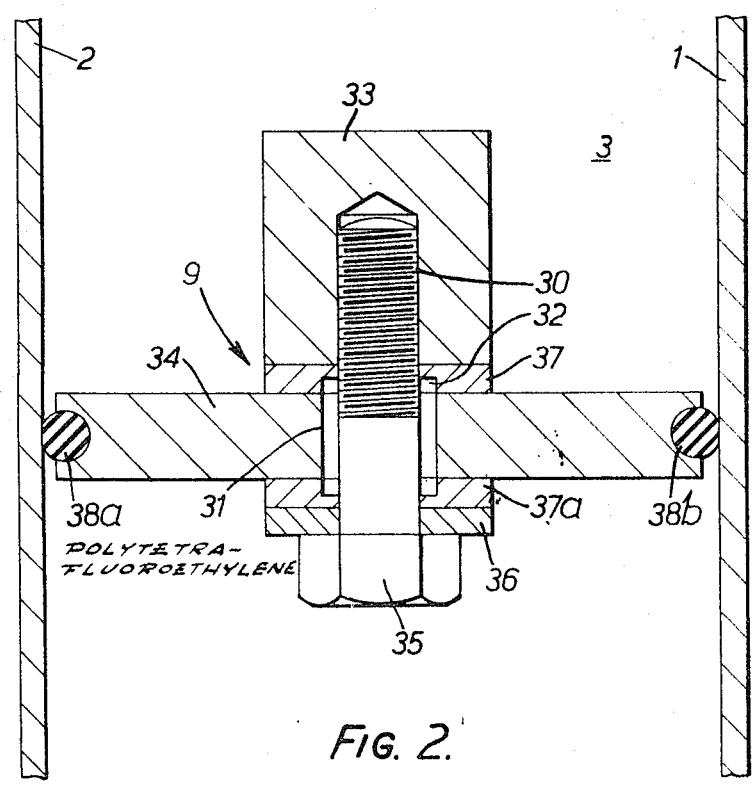
FIG. 2 is an enlarged view of a part of FIG. 1, showing a preferred construction of helical member in accordance with the invention.

As hereinbefore explained, the machanical nature of the apparatus and the temperature gradients involved make certain characteristics desirable in the helical member 9 and, in accordance with the present invention and as shown in FIG. 2, the member 9 is of composite construction and comprises a first helical element 33, of square cross-section, and a second helical element 34, of relatively narrow rectangular cross-section, extending across the annular space 2 and attached to the element 33 at intervals along its length. This second element 34 is dimensioned and toleranced with particular reference to the width of the annular space and is provided on both of its smaller sides with means for the attachment of sealing strips 38a and 38b respectively. A working clearance is provided between at least one of the sealing strips and the adjacent wall of the annular space. The element 33 is provided with threaded holes such as 30 at intervals along its length and the element 34 is attached thereto by set bolts such as 35 each passing through a hole such as 31 in the element 34 and engaging in a hole 30. The holes 31 in the element 34 are positioned along the centre line of the element and are of substantially larger diameter than the bolts 35. A washer 37 is located on each bolt intermediate the two helical elements, the washer being an interference fit on the bolt but being counterbored as at 32 to a depth approximating half the washer thickness and to a diameter equal to that of the hole 31. Another washer 37a similar to washer 37, is located on the opposite side of the element 34 and a further washer 36 is located under the bolt head.

Figure 3:
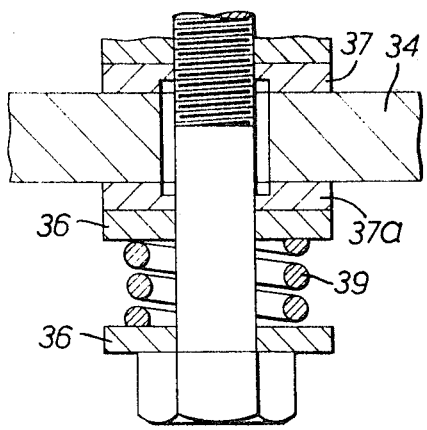
FIG. 3 is a scrap view similar to FIG. 2 of a modified form of helical member.

FIG. 3 shows a scrap section of part of a modified helical member similar to that of FIG. 2 but in which a compression spring 39 and a further washer 36 are fitted on the bolt between the bolt head and washer 37a.

In both embodiments, the element 33 is secured at one end to the mounting plate 8 (FIG. 1) carried by the drive shaft 6 and, as seen from FIG. 2, this element is located so as to rotate in spaced relationship to the walls of the annular space. The element 34 is carried by the element 33 and, again as seen in FIG. 2, extends across the space between the walls. For one or more of the reasons which have earlier been mentioned, when the apparatus is operating the rotation of the helical member may result in variation in the mean diameter of the helical element 33, so that its position relative to the walls of the annular vessel, for example the surface of cylinder 1, will vary. If element 34 were rigidly attached to element 33 it would be necessary in tolerancing the dimensions of element 34 to allow for diametral variations in element 33 when establishing the working clearances between the helical member and the vessel walls. However, in the construction described, element 34 is not rigidly attached to element 33 and, by reason of the oversized holes in element 34 and the washers 37 and 37a, the composite helical member is capable of accommodating diametral changes in element 33 whilst at the same time permitting element 34 to rotate in a fixed relatitonship with the axis of the vessel.

In practice, element 34 will rotate in sliding contact with either the inner or outer wall of the annular vessel depending on the direction of rotation. To minimise the areas in sliding contact the helical member should be rotated so that the helical element 34 is in contact with the inner wall of the annular vessel. Element 34 will also move in sliding contact with the washers 37 and 37a.

In the arrangement shown in FIG. 2, no provision is made to regulate the clamping forces applied through washers 37a to element 34, other than by adjustment of the set bolts 35. In the modified construction in FIG. 3 the springs 39 enable a controlled compression to be applied to the various sliding contact surfaces of the composite helical member.

The materials of construction to be employed will be dictated in some cases by the nature of the materials to be handled by the equipment. It is an important feature of the invention that the materials used for the washers 37 and 37a and sealing strips 8 be based on fluorine-containing polymers or copolymers, for example polytetrafluoroethylene (PTFE).

The functional requirements of these washers and sealing strips are that they should not react with the process materials handled and that they should have low frictional properties. PTFE is characterised by being immune to chemical attack except by molten alkalis, under all conditions met with in practice, and by having the lowest coefficient of friction of any known solid material. These desirable properties of PTFE and similar materials result in low rates of wear on surfaces in sliding contact and, because of the non-sticking characteristic of such materials, will inhibit any tendency to crystal build-up on sliding surfaces.

In the construction according to FIG. 3, the compression spring 39 is preferably sheathed in PTFE to prevent stress corrosion.

The forms of washers 37 and 37a and the sealing strips, as depicted in FIG. 2, are intended to be illustrative only and the invention contemplates any of a number of constructions which interpose PTFE or similar material between the helical member and the walls of the annular vessel or between components of the composite helical member.

What I claim is:

1. A continuous fractional crystallisation apparatus comprising a vessel having an outer cylindrical wall and a concentric inner cylindrical wall forming between them an annular space, a helical member located within the vessel so as to surround said inner cylindrical wall and extending substantially the whole length of said annular space, and means to transmit rotational drive to the helical member to rotate the helical member about the axis thereof, said helical member comprising a plurality of longitudinally contiguous superposed helical elements, the first of which elements is connected directly to said drive transmitting means and the second of which elements defines a substantially continuous surface encircling said inner cylindrical wall, and means connecting said second helical element to the first helical element for rotation therewith, the longitudinal edges of the surface defined by said second element extending beyond the longitudinal edges of said first element to leave at most a working contact clearance between each longitudinal edge of said second element and the nearest wall and the means connecting the two elements permitting limited relative movement between said first and second elements.

2. Apparatus as claimed in claim 1, wherein said first helical element has a rectangular cross-section of width small relative to the length, and said first element is attached to said second helical element by bolts passing through the major faces of said first helical element and located at spaced intervals along the length of said helical elements.

3. Apparatus as claimed in claim 2, wherein said second helical element is located within the annular space mid-way between said wall surfaces, and said bolts are located along the centre lines of said helical elements.

4. Apparatus as claimed in claim 2, wherein washers of a material having a low coefficient of friction are provided on each bolt one contiguous with each major face of said first helical element, and each bolt passes through the first helical element with clearance such that said first helical element is capable of limited sliding movement relative to the contiguous faces of said washers and to said second helical element.

5. Apparatus as claimed in claim 2, including a compression spring carried by each bolt and located between the bolt head and said first helical element, whereby controlled compression can be applied to the contacting surfaces through which the bolt passes.

6. Apparatus as claimed in claim 1, including sealing means carried by said first helical element and located adjacent each of said wall surfaces.

7. Apparatus as claimed in claim 6, wherein said sealing means comprise strips of sealing material attached one to each of the minor faces of said first helical element.

8. Apparatus as claimed in claim 4, wherein the material of said washers is based on a fluorine-containing polymer or copolymer.

9. Apparatus as claimed in claim 7, wherein said sealing material is based on a fluorine-containing polymer or copolymer.

10. Apparatus as claimed in claim 8, wherein said fluorine-containing polymer or copolymer is polytetrafluoroethylene.

References Cited

UNITED STATES PATENTS

| | | | |
|---|---|---|---|
| 3,101,598 | 8/1963 | Ross | 62—354 |
| 3,266,555 | 8/1966 | Thier | 159—6W |

NORMAN YUDKOFF, Primary Examiner

S. SILVERBERG, Assistant Examiner

U.S. Cl. X.R.

23—273F; 62—58, 354; 159—6W